United States Patent
Masas (10) Patent No.: US 12,177,182 B2
(45) Date of Patent: Dec. 24, 2024

(54) CLIENT-SIDE FIREWALL

(71) Applicant: Imperva, Inc., San Mateo, CA (US)

(72) Inventor: Ron Masas, Bat Yam (IL)

(73) Assignee: Imperva, Inc., San Mateo, CA (US)

( * ) Notice: Subject to any disclaimer, the term of this patent is extended or adjusted under 35 U.S.C. 154(b) by 352 days.

(21) Appl. No.: 17/646,597

(22) Filed: Dec. 30, 2021

(65) Prior Publication Data

US 2023/0216830 A1 Jul. 6, 2023

(51) Int. Cl.
*H04L 9/40* (2022.01)
*H04L 9/32* (2006.01)

(52) U.S. Cl.
CPC ........ *H04L 63/0263* (2013.01); *H04L 9/3247* (2013.01)

(58) Field of Classification Search
CPC ............. H04L 63/0227; H04L 63/0236; H04L 63/0263; H04L 9/3247
See application file for complete search history.

(56) References Cited

U.S. PATENT DOCUMENTS

| | | | | |
|---|---|---|---|---|
| 5,958,016 | A * | 9/1999 | Chang | H04Q 3/0033 709/224 |
| 9,838,358 | B2 * | 12/2017 | Dickinson, III | H04L 63/0428 |
| 2008/0222715 | A1 * | 9/2008 | Bansal | H04L 63/0218 726/11 |

OTHER PUBLICATIONS

"Kirda et al., Noxes: Client-Side Solution for Mitigating Cross-Site Scripting Attacks, Apr. 23, 2006, p. 330-337" (Year: 2006).*
"Engin Kirda, Christopher Kruegel, Giovanni Vigna, and Nenad Jovanoic, Noxes: A Client-Side Solution for Mitigating Cross-Site Scripting Attacks, Apr. 23-37, 2006, Technical University of Vienna, University of California, Santa Barbara, pp. 330-337" (Year: 2006).*
Bernstein, et al., "High-speed high-security signatures," Journal of Cryptographic Engineering 2, Sep. 26, 2011, pp. 1-23.
"Ed25519: high-speed high-security signatures," Introduction, version Jan. 22, 2017, downloaded from http://ed25519.cr.yp.to/ on Dec. 30, 2021, pp. 1-2.
Gaunt, M., "Service Workers: an Introduction," Google Developers, Web Fundamentals, downloaded from https://developers.google.com/web/fundamentals/primers/service-workers on Dec. 29, 2021, pp. 1-14.

(Continued)

*Primary Examiner* — Daniel B Potratz
*Assistant Examiner* — Faghia Telat Rana (57) ABSTRACT

A method by a service worker firewall middleware component is disclosed. The method includes causing a service worker firewall associated with a web site to be installed on a web browser, obtaining one or more rules in response to receiving a request from the service worker firewall for rules to be applied by the service worker firewall, sending a response to the service worker firewall, wherein the response includes the one or more rules, a digital signature for the one or more rules, and an indication of when the digital signature expires, wherein the digital signature is generated using a private key associated with the website, and receiving a rules violation report from the service worker firewall, wherein the rules violation report was generated as a result of the service worker firewall applying the one or more rules to cross-origin requests.

20 Claims, 7 Drawing Sheets

(56) References Cited

OTHER PUBLICATIONS

Imperva, "Client-Side Protection," Capability Brief, copyright 2020, downloaded from https://www.imperva.com/resources/datasheets/Imperva_Client-Side_Protection.pdf on Dec. 30, 2021, pp. 1-2.
Mozilla, MDN Web Docs, "Content Security Policy (CSP)," last modified Nov. 30, 2021, downloaded from https://developer.mozilla.org/en-US/docs/Web/HTTP/CSP on Dec. 30, 2021, pp. 1-26.
Npm, Inc., "TweetNaCl.js," Documentation, version 1.0.3, downloaded from https://www.npmjs.com/package/tweetnacl on Dec. 30, 2021, pp. 1-15.

* cited by examiner

CLIENT-SIDE FIREWALL

TECHNICAL FIELD

Embodiments of the invention relate to the field of computer network security, and more specifically, to a client-side firewall for detecting and mitigating client-side attacks.

BACKGROUND

Content Security Policy (CSP) is a computer security standard introduced to prevent client-side attacks such as cross-site scripting (XSS). A website owner or administrator may use CSP to declare approved sources of content that web browsers are allowed to load from their website. CSP is supported by most modern web browsers.

An existing approach to detecting and/or mitigating client-side attacks uses CSP to collect information about client-side network activity such as the target uniform resource locator (URL), request method, and the initiator script. However, approaches that rely on CSP are blind to certain important information such as the request body and headers. Also, approaches that rely on CSP require the website owner or administrator to create a whitelist (e.g., a list of allowed sources), which can be difficult to create and keep up to date.

Another existing approach to detecting and/or mitigating client-side attacks relies on agents installed on individual client devices to gain visibility into the client-side network activity. However, the agent-based approach requires installing the agent on individual client devices, which is intrusive and not always possible. As a result, the agent-based approach typically has limited reach.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video).

As mentioned above, existing approaches to detecting and/or mitigating client-side attacks have limited visibility into client-side network activity and/or require installing an agent on individual client devices. Embodiments disclosed herein may address one or more drawbacks of the existing approaches by using a web browser service worker to implement a client-side network proxy, which is referred to herein as a service worker firewall. The service worker firewall may provide greater visibility into the client-side network activity and may monitor and block network requests generated by the web browser with finer granularity. Also, since the service worker firewall is implemented using a service worker, it may be relatively less intrusive and easier to deploy compared to existing approaches.

A service worker is code that a web browser executes in the background, separately from the webpage. Service workers enable implementing features that do not need the webpage or user interaction. Service workers are commonly used to implement features such as caching and offline experiences.

According to an embodiment, a service worker firewall middleware component causes a service worker firewall associated with a website to be installed on a web browser and sends a public key associated with the website to the service worker. Once installed on the web browser, the service worker firewall may send a request to the service worker firewall middleware component for rules that the service worker firewall is to apply. Responsive to receiving the request, the service worker firewall middleware component obtains one or more rules that are to be applied by the service worker firewall (e.g., from a local data storage or from a service worker firewall backend component) and sends a response to the service worker firewall, where the response includes the one or more rules, a digital signature for the one or more rules, and an indication of when the digital signature expires. The digital signature may be generated using a private key associated with the website that corresponds to the public key. The service worker firewall may determine whether the digital signature that it received from the service worker firewall middleware component is valid based on the public key and the indication of when the digital signature expires. If the service worker firewall determines that the digital signature is valid, then it may start applying the one or more rules to cross-origin requests generated by the web browser.

A technical advantage of embodiments disclosed herein is that they provide increased visibility into client-side network activity compared to approaches that rely on the Content Security Policy (CSP) feature of web browsers, which allows for monitoring and blocking client-side network requests with finer granularity. For example, in an embodiment, the service worker firewall is able to block network requests based on request headers and/or uniform resource locator (URL). As another example, in an embodiment, the service worker firewall may block the transmission of sensitive information such as credit card numbers sent to a cross-origin webpage by monitoring the request body, URL, and headers for credit card number patterns. Also, a technical advantage of embodiments disclosed herein is that the service worker firewall may be deployed as a service worker. As such, embodiments do not require the intrusive and cumbersome task of installing agents on individual client devices. Also, a technical advantage of embodiments disclosed herein is that they include a mechanism to prevent tampering of the service worker firewall rules. Other advantages will be apparent to those skilled in the technical art in view of the present disclosure. Embodiments are now described with reference to the accompanying figures.

Figure 1:
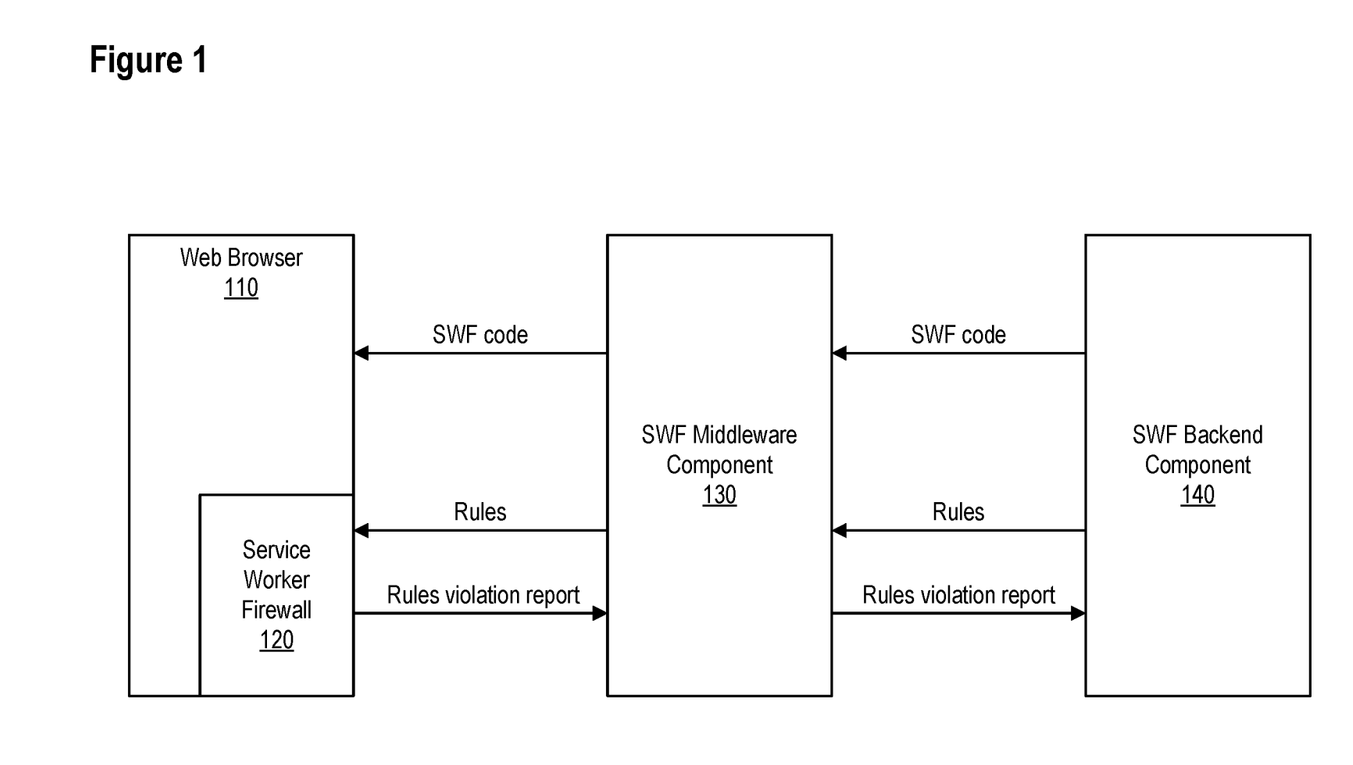
FIG. 1 is a diagram showing an environment in which a service worker firewall may be deployed, according to some embodiments.

FIG. 1 is a diagram showing an environment in which a service worker firewall may be deployed, according to some embodiments. As shown in the diagram, the environment includes a web browser 110, a service worker firewall (SWF) middleware component 130, and a SWF backend component 140.

The web browser 110 is an application executable on a client network device (e.g., a laptop, desktop, tablet, smart phone, etc.) that can be used to access a webpage of a website over a network (e.g., the internet) and display the webpage to an end user of the client network device. Examples of web browsers that are currently widely in use include Google Chrome®, Microsoft Edge®, and Mozilla Firefox®. The web browser 110 supports the use of service workers. For sake of illustrating embodiments, the diagram shows a single web browser 110. However, it should be understood that the environment may include, and will typically include, multiple web browsers.

As will be further described herein, the SWF backend component 140 is a component that provides backend services for a service worker firewall. The SWF backend component 140 may be implemented by one or more network devices.

As will be further described herein, the SWF middleware component 130 is a component that acts as a bridge between the web browser 110 and the SWF backend component 140. The SWF middleware component 130 may be implemented by one or more network devices. In an embodiment, the SWF middleware component 130 is implemented as part of or in conjunction with a reverse proxy or a backend server.

The SWF backend component 140 may manage code for implementing a service worker firewall (also referred to herein as "SWF code") and rules that are to be applied by the service worker firewall.

As shown in the diagram, the SWF middleware component 130 may communicate with the SWF backend component 140 to obtain the SWF code and the rules that are to be applied by the service worker firewall. The SWF middleware component 130 may communicate with the web browser 110 to send the SWF code to the web browser 110 when the web browser 110 loads a webpage of a website. The web browser 110 may install the service worker firewall 120 using the SWF code. The service worker firewall 120 is associated with a website (or other service worker scope) such that it is able to monitor events (e.g., "fetch" events) associated with the website. Once installed, the service worker firewall 120 may communicate with the SWF middleware component 130 to obtain the rules that it is to apply and store the rules in a client-side data storage that the service worker firewall 120 can access (e.g., IndexedDB).

The service worker firewall 120 may apply the rules to cross-origin requests generated by the web browser 110 from the website. As used herein, a cross-origin request is a network request (e.g., a Hypertext Transfer Protocol (HTTP) request) to a source that is not the source of the website (not the origin). If the service worker firewall 120 detects any cross-origin requests that cause any of the rules to be triggered, then it may generate and send a rules violation report to the SWF middleware component 130 that indicates which rules were triggered and/or information regarding the cross-origin requests that caused the rules to be triggered. In an embodiment, depending on the rules, the service worker firewall 120 may block one or more of the cross-origin requests. The SWF middleware component 130 may then send the rules violation report to the SWF backend component 140. The website owner or administrator (or other personnel) may view the rules violation report to determine which rule was triggered and various details regarding the cross-origin request that caused the rule to be triggered.

Typically, a service worker is only allowed to access a particular client-side data storage (e.g., IndexedDB). Other client-side data storages and cookies may not be accessible in its execution context. The client-side data storage used by the service worker may be accessible to potential attackers, which introduces a potential tampering risk (e.g., tampering of the rules stored therein). In an embodiment, to mitigate this risk, the SWF backend component 140 generates a private key and public key pair for each website that enrolls for service worker firewall protection. The SWF backend component 140 may then digitally sign the rules that a service worker associated with a website is to apply using the private key associated with the website to generate a digital signature. The service worker firewall 120 is provided the corresponding public key and may verify the digital signature using the public key before applying the rules. In an embodiment, the SWF backend component 140 provides the public key to the SWF middleware component 130 and the SWF middleware component 130 provides the public key to the web browser 110 along with the SWF code or as part of the SWF code. The SWF backend component 140 may digitally sign the rules to be applied by a service worker firewall 120 associated with a website using the private key associated with the website whenever the rules are updated. To reduce the risk of tampering, the private key should not be made accessible to the web browser 110 or the SWF middleware component 130 directly.

In an embodiment, the Ed25519 signature scheme is used to digitally sign rules. Ed25519 is a Edwards-curve Digital Signature Algorithm (EdDSA) signature scheme that has various desirable features that make it suitable for use with embodiments disclosed herein including fast single-signature verification, high security levels, good web browser support, small signatures, and a small library. Ed25519 is mentioned herein by way of example. It should be understood that other embodiments may use different signature schemes.

In an embodiment, a predetermined URL (referred to herein as the "SWF code URL") is created that can be used to obtain the SWF code. In an embodiment, the SWF code URL is made accessible from the root directory of the website due to the service worker scope. In an embodiment, submitting a request to the SWF code URL returns a response that includes the SWF code and the public key associated with the website. As an example, submitting a request to the SWF code URL may return the following response (where "%%SITE_PUBLIC_KEY%%" represents the public key associated with the website and the commented section referring to "service worker firewall code . . ." represents the actual SWF code, which may be JavaScript code):

```
HTTP/1.1 200 OK
Content-Type: text/javascript
Connection: Closed
const SITE_PUBLIC_KEY = "%%SITE_PUBLIC_KEY%%";
/* service worker firewall code... */
```

In an embodiment, the service worker firewall 120 adds a special header to each request that is not a cross-origin request (referred to herein as a "same-origin" request). The SWF middleware component 130 may detect when a same-origin request does not include the special header, which indicates that the request did not get processed by the service worker firewall 120 (e.g., due to the service worker firewall 120 not yet being installed on the web browser 110 or due to the request bypassing the service worker firewall 120). If the SWF middleware component 130 detects a same-origin request that does not include the special header, then it may cause the service worker firewall 120 to be installed or reinstalled on the web browser 110 that generated the request.

For example, the SWF middleware component 130 may inject the below code into the response if the SWF middleware component 130 determines that the same-origin request does not include the special header. The below code causes the web browser to install the service worker firewall 120 (using the "serviceWorker.register" method pointing to the SWF code URL ("/special_url_swf.js" in this example)) if the web browser 110 supports service workers.

```
<script>
    if ("serviceWorker" in navigator) {
        navigator.serviceWorker.register("/special_url_swf.js");
    }
</script>
```

In an embodiment, a predetermined URL (referred to herein as the "rules fetching URL") is created that can be used to obtain rules. In an embodiment, submitting a request to the rules fetching URL returns a response that includes one or more rules, a digital signature for the one or more rules (e.g., that was generated using the private key associated with the website), and an indication of when the digital signature expires (e.g., represented in JavaScript Object Notation (JSON) format). In an embodiment, the indication of when the digital signature expires includes the time (e.g., UTC time) at which the digital signature was generated and the time-to-live of the digital signature (e.g., represented in milliseconds), which indicates that the digital signature expires time-to-live time after the time at which the digital signature was generated.

As an example, submitting a request to the rules fetching URL may return a response that includes the below JSON. The JSON includes a single rule (the "rules" attribute) for blocking ("BLOCK") every POST request that includes a credit card number pattern (matching the regular expression "(\\d{4}-){4}") in the request body, a digital signature (the "signature" attribute), a timestamp (e.g., in UTC time) of when the digital signature was generated (the "signedAt" attribute), and for how long the digital signature is valid (the "TTL" attribute).

```
{
    "rules": [
        [
            "method",
            "==",
            "POST",
            [
                [
                    "body",
                    "~=",
                    "(\\d{4}-){4}",
                    "BLOCK"
                ]
            ]
        ]
    ],
    "TTL": "3600000",
    "signedAt": "1618229956593",
    "signature":
    "2e0877d77e6762ace0e8dbb9ce9fc2bbc187055d784925e0d8531b198d0e0e7116736f3be463
    014b2741511d09027a50ff9bc259155cc602052e58560dd0320c"
}
```

In an embodiment, a rule may indicate a fact, an operator, an argument, and an event or a nested rule. A fact may represent an attribute of a request. Examples of facts are shown in Table I below. It should be understood that the facts shown in Table I are provided by way of example, and that other embodiments may support the use of different facts than shown in Table I.

TABLE I

| Fact | Description |
| --- | --- |
| url.href | A String, representing the entire URL of the page, including the protocol |
| url.pathname | A String, representing the pathname |
| url.search | A String, representing the query string part of a URL, including the question mark (?) |
| url.origin | A String, representing the protocol (including ://), the domain name (or IP address) and port number (including the colon sign (:) of the URL. |
| url.hostname | A String, representing the domain name, or the IP address of a URL |
| headers.<name> | A String, representing the value of an arbitrary header |
| body | A String, representing the request body as text |
| method | A String, representing the request HTTP method |

An operator may represent a mathematical, relational, or logical operation. Examples of operators and example usages of those operators are shown in Table II below. It should be understood that the operators shown in Table II are provided by way of example, and that other embodiments may support the use of different operators than shown in Table II.

TABLE II

| Operator | Example | Description |
| --- | --- | --- |
| in | ["method","in",["GET","POST"]] | checks whether a fact is in a given String array |
| !in | ["method","!in",["GET","DELETE"]] | checks whether a fact is not in a given String array |
| =* | ["pathname","=*","/user"] | checks whether a fact ends with a given String |
| *= | ["headers.user-agent","*=","fire"] | checks whether a fact starts with a given String |
| % | ["headers.user-agent","%","evil"] | checks whether a fact contains a given String |
| == | ["method","==","POST"] | checks whether a fact is equals to a given String |
| != | ["method","!=","POST"] | checks whether a fact is not equals to a given String |
| ~= | ["body","~=","(\d{4}-){4}"] | checks whether a fact matches a given regular expression |

An argument may be a value that is to be evaluated using an operator. For example, in the example usages shown in Table II, the array "['GET', 'POST']", the String "/user", and the regular expression "(\d{4}-){4}" are arguments.

An event may represent an action to perform if a rule is triggered. In an embodiment, an event may be a block event or an alert event, where the block event indicates that a request should be blocked and the alert event indicates that an alert should be generated (e.g., a rules violation report). In an embodiment, it is implicit that a block event indicates that an alert should be generated in addition to blocking the request.

A nested rule may be a rule within a rule. In an embodiment, when a rule includes a nested rule, this indicates that both the outer rule and the inner rule have to be triggered for the entire rule to be triggered (thus, the nesting represents a logical AND operation—in other embodiments the nesting may represent a logical OR operation). For example, in the example rule provided above, the nesting indicates that the rule is triggered when both the method is "POST" and the request body includes a credit card number pattern. In an embodiment, there can be multiple layers of nested rules. In an embodiment, a rule is represented in JSON format (e.g., as in the example provided above).

Figure 2:
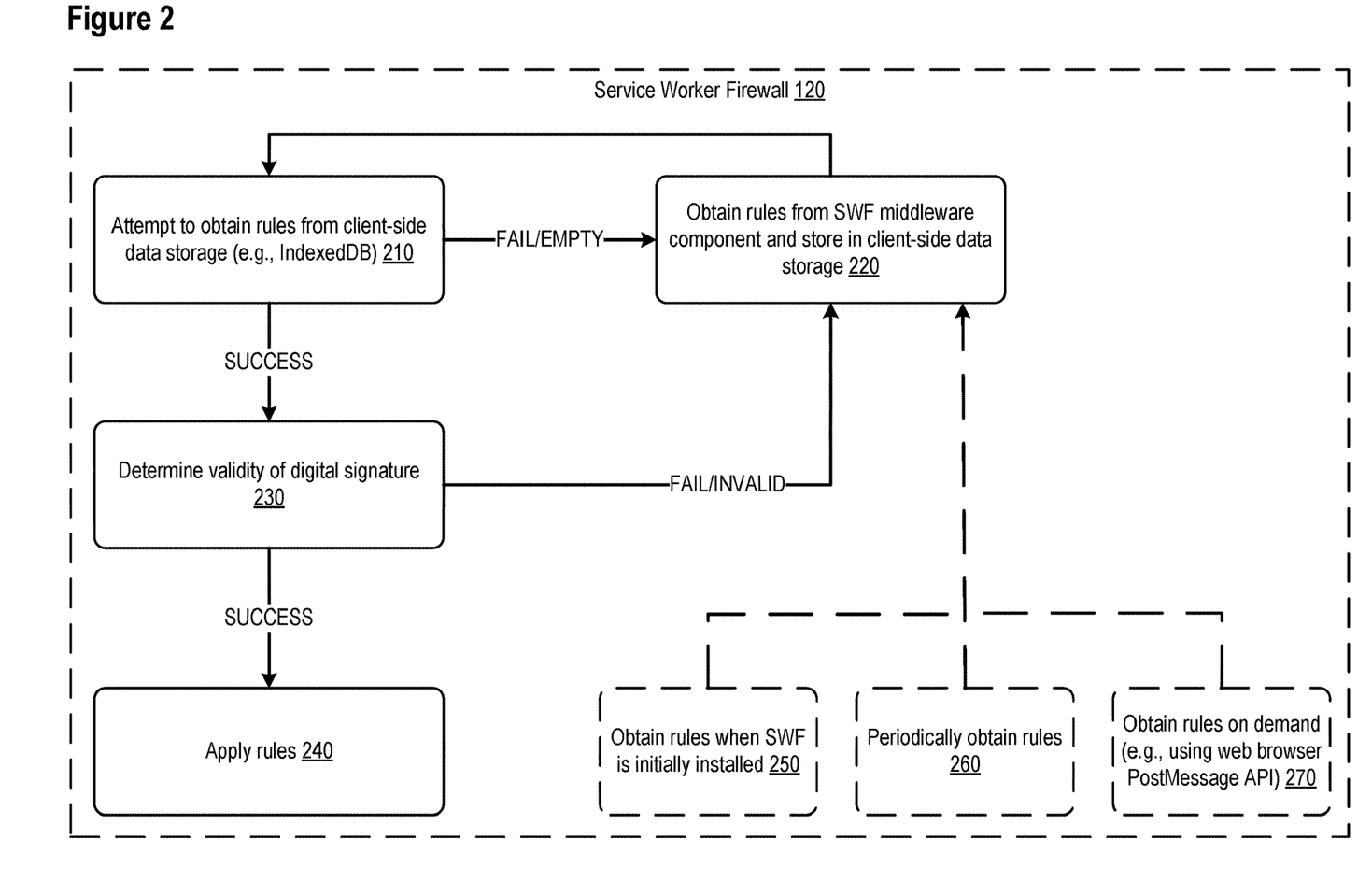
FIG. 2 is a diagram showing a rules lifecycle, according to some embodiments.

FIG. 2 is a diagram showing a rules lifecycle, according to some embodiments.

As shown in the diagram, at block 210, the service worker firewall 120 attempts to obtain rules from the client-side data storage (e.g., IndexedDB). If the attempt fails or the client-side data storage contains no rules, then at block 220, the service worker firewall 120 obtains rules from the SWF middleware component 130 (e.g., using the rules fetching URL) and stores the rules in the client-side data storage.

If the attempt at block 210 to obtain rules from the client-side data storage is successful, at block 230, the service worker firewall 120 determines whether the digital signature for the rules is valid. This may involve verifying the digital signature using the public key associated with the website and verifying that the digital signature has not expired.

If the digital signature is determined to be invalid (e.g., because the digital signature does not match the rules or the digital signature has expired) the service worker firewall 120 performs the operation of block 220. That is, the service worker firewall 120 obtains rules from the SWF middleware component 130 and stores the rules in the client-side data storage (at block 220). Otherwise, if verification of the digital signature is successful, then at block 240, the service worker firewall 120 applies the rules to cross-origin requests.

In an embodiment, the service worker firewall 120 attempts to obtain rules from the SWF middleware component 130 when the service worker firewall is initially installed on the web browser 110 (block 250), attempts to obtain rules (or updated to the rules) from the SWF middleware component 130 periodically (e.g., every N minutes), and/or attempts to obtain rules (or updates to the rules) from the SWF middleware component 130 on demand (e.g., the web browser 110 may communicate with the service worker firewall 120 using a postMessage API to force the service worker firewall 120 to obtain rules on demand). This may allow the service worker firewall 120 to stay up to date with the latest rules.

Figure 3:
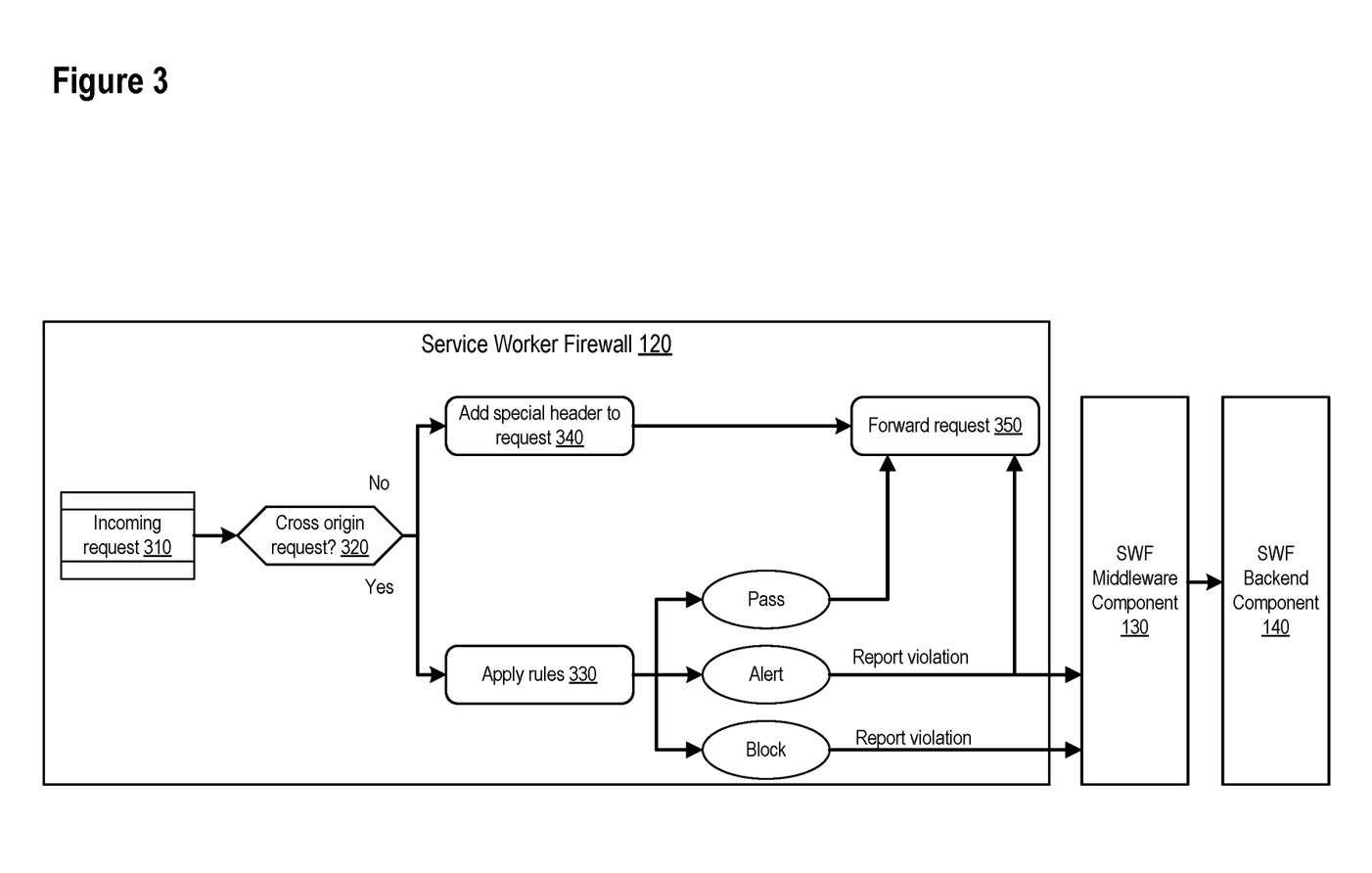
FIG. 3 is a diagram showing operations by a service worker firewall for processing an incoming request, according to some embodiments.

FIG. 3 is a diagram showing operations by a service worker firewall for processing an incoming request, according to some embodiments.

As shown in the diagram, when the service worker firewall 120 receives an incoming request 310 (e.g., an HTTP request generated by the web browser 110), at decision block 320, it determines whether the request 310 is a cross-origin request. If the request 310 is not a cross-origin request (i.e., it is a same-origin request), then at block 340, the service worker firewall 120 adds a special header to the request 310, and at block 350, forwards the request 310 towards its destination.

Returning to decision block 320, if the request 310 is determined to be a cross-origin request, then at block 330, the service worker firewall 120 applies the rules to the request 310. Applying the rules may result in allowing the request to be sent (without generating an alert) ("Pass"), generating an alert (but allowing the request to be sent) ("Alert"), or blocking the request ("Block"). In the "Alert"

and "Block" cases, the service worker firewall 120 may generate and send a rules violation report to the SWF middleware component 130. The rules violation report may include information regarding which rule was triggered and details regarding the request that caused the rule to be triggered. The SWF middleware component 130 may send the rules violation report to the SWF backend component 140. The website owner or administrator (or other personnel) may view the rules violation report to determine which rule was triggered and various details regarding the request 310 that caused the rule to be triggered.

Figure 4:
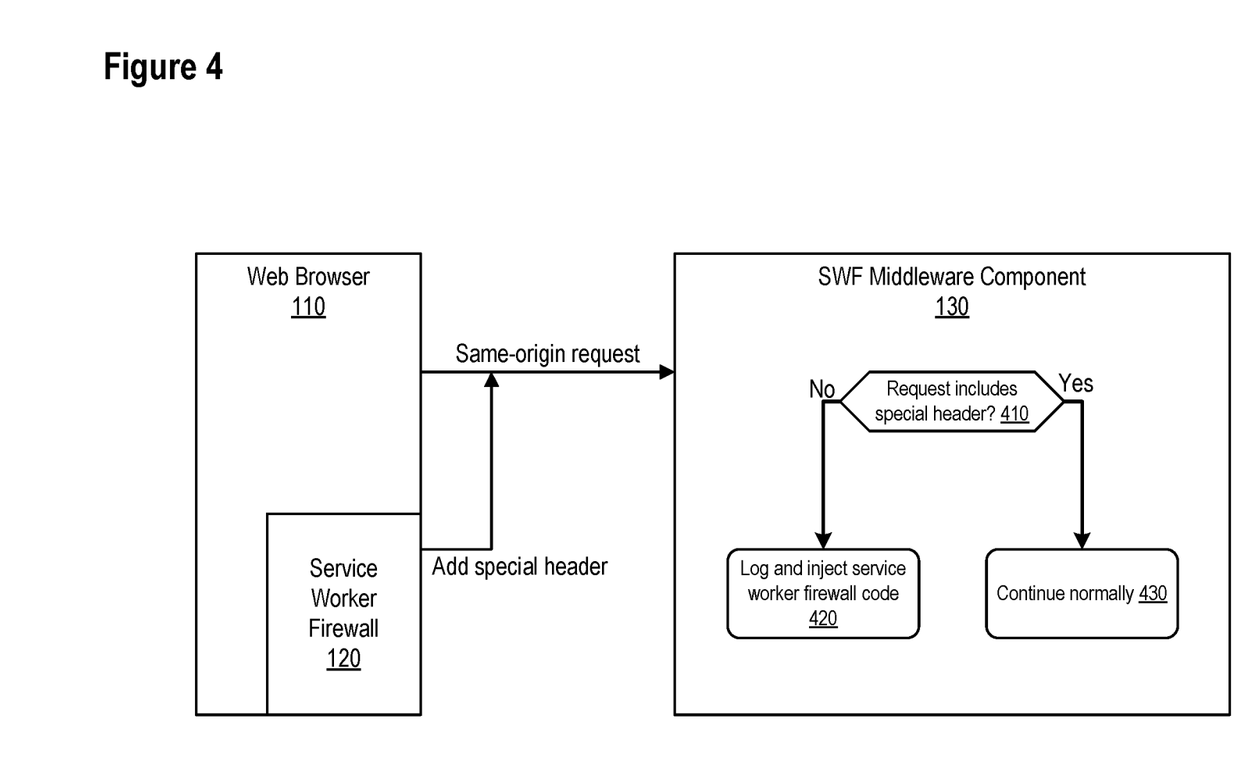
FIG. 4 is a diagram showing operations for detecting and protecting against tampering, according to some embodiments.

FIG. 4 is a diagram showing operations for detecting and protecting against tampering of a service worker firewall, according to some embodiments. As shown in the diagram, when the web browser 110 sends a same-origin request, the service worker firewall 120 is configured to add a special header to the request. The SWF middleware component 130 may receive same-origin requests sent by the web browser 110 (e.g., because it is implemented as part of a reverse proxy that protects the origin server hosting the website) and may know about the special header (e.g., it knows what the special header looks like and knows that requests for a particular website should include the special header). At block 410, when the SWF middleware component 130 receives a request, it determines whether the request includes the special header. If the request includes the special header, then at block 430, the SWF middleware component 130 processes the request normally (e.g., forwards the request to the origin server). Otherwise, If the request does not include the special header, then at block 420, the SWF middleware component 130 logs this occurrence (since it might be indicative of suspicious/malicious activity) and injects the SWF code into the corresponding response to cause the service worker firewall to be (re) installed on the web browser 110.

While a certain arrangement of components is shown in the diagrams, it should be understood that such arrangement is shown by way of example, and not intended to be limiting. It should be understood that embodiments can be implemented using an arrangement that is different from what is shown in the diagrams. For example, while embodiments have been described where the SWF middleware component 130 and the SWF backend component 140 are implemented as separate components (e.g., potentially implemented by different network devices communicating over a network), in some embodiments, these components can be implemented together (e.g., as part of the same software executing on the same network device). Also, while embodiments have been primarily described for applying rules to network requests, certain embodiments may also apply rules to network responses.

Embodiments provide a service worker firewall that may be programmed with rules in real time to help detect and mitigate client-side attacks. The service worker firewall has increased visibility into client-side network activity, and thus can monitor and block client-side network requests with finer granularity compared to existing CSP-based approaches.

Embodiments may prevent against tampering in various ways. For example, if an attacker uninstalls or disables the service worker firewall, embodiments may detect this based on the special header added to requests and reinstall the service worker firewall. Also, embodiments may prevent an attacker from tampering with the rules (e.g., modifying or deleting rules) since rules are digitally signed and verified before use. If the attacker tries to modify a rule, then digital signature verification will fail. Also, embodiments may prevent an attacker from reusing old rules since the digital signatures have expirations.

Figure 5:
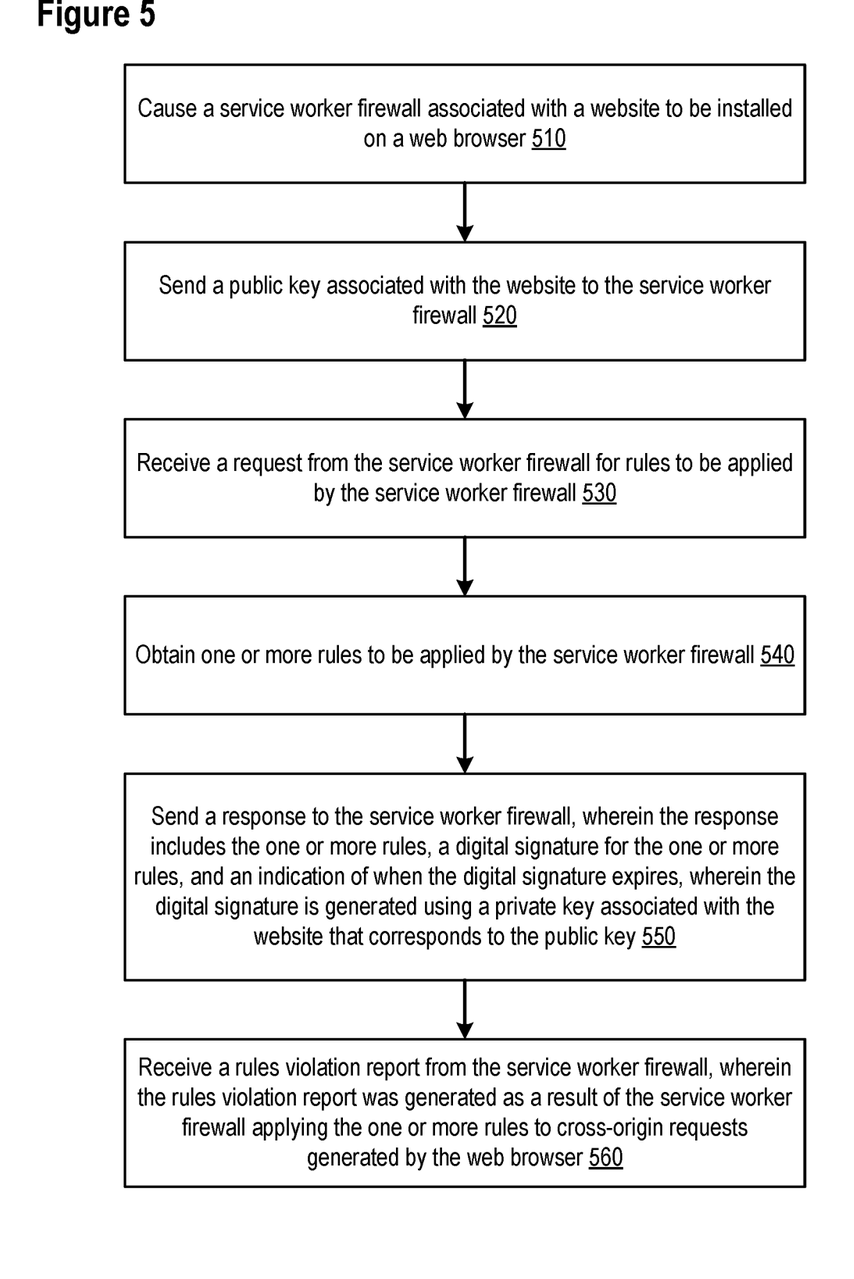
FIG. 5 is a flow diagram showing a method by a SWF middleware component for deploying and configuring a service worker firewall, according to some embodiments.

FIG. 5 is a flow diagram showing a method by a SWF middleware component for deploying and configuring a service worker firewall, according to some embodiments.

The operations in the flow diagrams are described with reference to the exemplary embodiments of the other diagrams. However, it should be understood that the operations of the flow diagrams can be performed by embodiments other than those discussed with reference to these other diagrams, and the embodiments discussed with reference to these other diagrams can perform operations different than those discussed with reference to the flow diagrams. Also, while the flow diagrams show a particular order of operations performed by certain embodiments, it should be understood that such order is provided as an example (e.g., alternative embodiments may perform the operations in a different order, combine certain operations, overlap certain operations, etc.).

At block 510, the SWF middleware component causes a service worker firewall associated with a website to be installed on a web browser.

At block 520, the SWF middleware component sends a public key associated with the website to the service worker firewall.

At block 530, the SWF middleware component receives a request from the service worker firewall for rules to be applied by the service worker firewall.

At block 540, the SWF middleware component obtains one or more rules to be applied by the service worker firewall in response to receiving the request. In an embodiment, a rule from the one or more rules indicates a fact, an operator, an argument, and an event or a nested rule. In an embodiment, the fact indicates a full uniform resource locator (URL), a pathname of a URL, a query string of a URL, an origin of a URL, a hostname of a URL, a header of a request, a body of a request, or a request method of a request. In an embodiment, the operator indicates to check whether a fact is in a given array, to check whether a fact is not in a given array, to check whether a fact ends with a given string, to check whether a fact starts with a given string, to check whether a fact contains a given string, to check whether a fact is equal to a given string, to check whether a fact is not equal to a given string, or to check whether a fact matches a given regular expression. In an embodiment, the event is a block event or an alert event.

At block 550, the SWF middleware component sends a response to the service worker firewall, wherein the response includes the one or more rules, a digital signature for the one or more rules, and an indication of when the digital signature expires, wherein the digital signature is generated using a private key associated with the website that corresponds to the public key.

At block 560, the SWF middleware component receives a rules violation report from the service worker firewall, wherein the rules violation report was generated as a result of the service worker firewall applying the one or more rules to cross-origin requests generated by the web browser.

In an embodiment, the SWF middleware component is communicatively coupled to a SWF backend component, wherein the SWF backend component generates and provides the one or more rules, the digital signature, and the public key to the SWF middleware component. In an embodiment, the SWF middleware component sends the rules violation report to the SWF backend component.

In an embodiment, the SWF middleware component receives a same-origin request generated by the web browser and determines whether the same-origin request includes a predefined special header. If the SWF middleware component determines that the same-origin request does not include the predefined special header, then it may cause the service worker firewall to be installed on the web browser.

Figure 6:
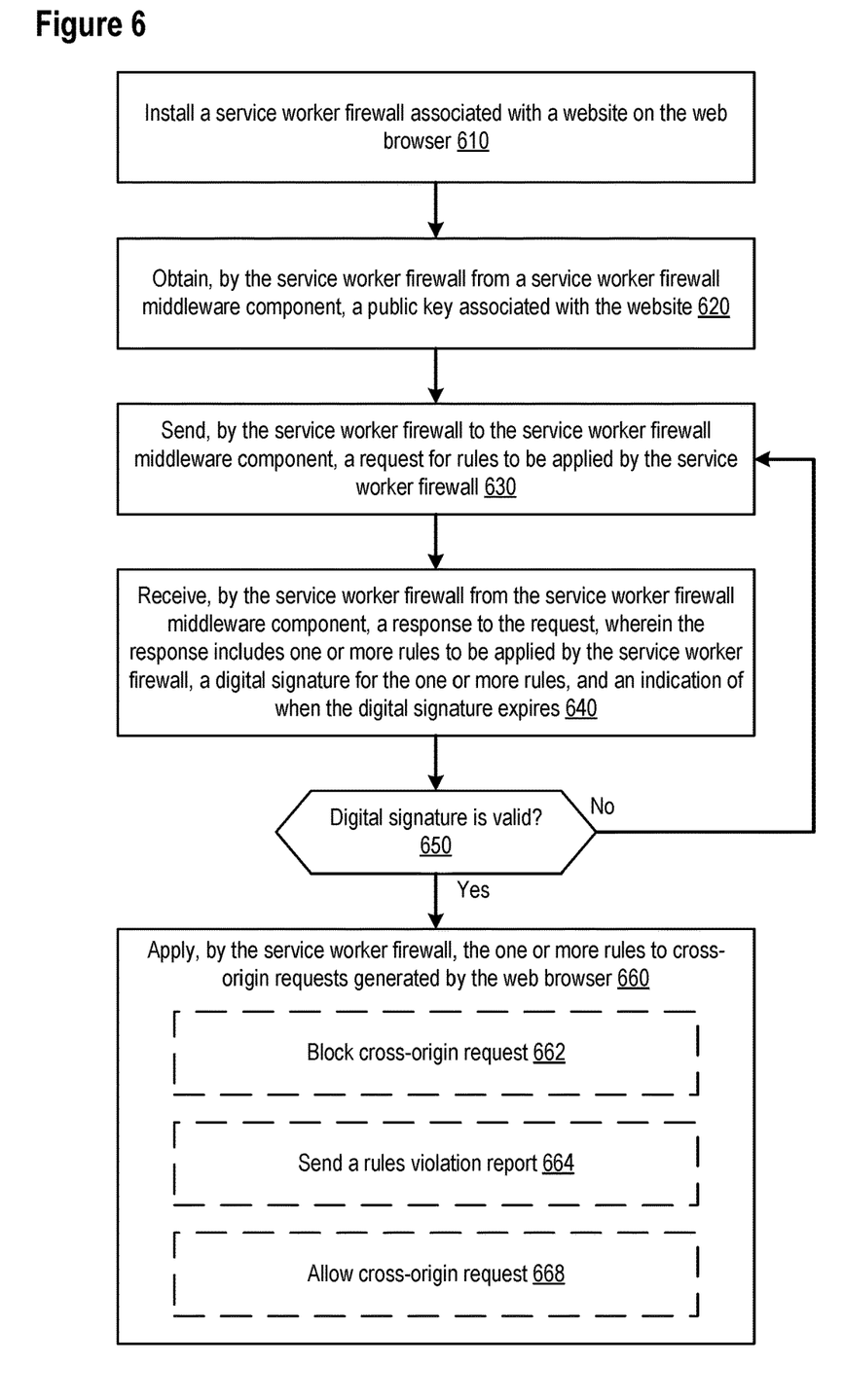
FIG. 6 is a flow diagram showing a method by a web browser for implementing a service worker firewall, according to some embodiments.

FIG. 6 is a flow diagram showing a method by a web browser for implementing a service worker firewall, according to some embodiments.

At block 610, the web browser installs a service worker firewall associated with a web site on the web browser.

At block 620, the service worker firewall (installed on the web browser) obtains from a SWF middleware component, a public key associated with the website.

At block 630, the service worker firewall sends to the service worker firewall component a request for rules to applied by the service worker firewall.

At block 640, the service worker firewall receives the SWF middleware component a response to the request, wherein the response includes one or more rules to be applied by the service worker firewall, a digital signature for the one or more rules, and an indication of when the digital signature expires. In an embodiment, the service worker firewall stores the one or more rules in a client-side data storage (e.g., IndexedDB).

At decision block 650, the service worker firewall determines whether the digital signature is valid. If the service worker firewall determines that the digital signature is not valid, then it moves to block 630, where it sends another request to the service worker firewall middleware component for rules to be applied by the service worker firewall.

Otherwise, if the service worker firewall determines that the digital signature is valid, then at block 660, the service worker firewall applies the one or more rules to cross-origin requests generated by the web browser. In an embodiment, applying the rules may result in blocking the cross-origin request (block 662) and/or sending a rules violation report to the SWF middleware component (indicating that a rule has been triggered) (block 664). In an embodiment, if a rule having a block event is not triggered, then the web browser may allow the cross-origin request to be sent (block 668).

In an embodiment, the service worker firewall periodically sends to the SWF middleware component, a request for rules to be applied by the service worker firewall.

In an embodiment, the web browser obtains service worker firewall code using a first predetermined URL (e.g., the SWF code URL) and the service worker firewall sends the request for rules using a second predetermined URL (e.g., the rules fetching URL).

In an embodiment, the service worker firewall adds a predefined special header to same-origin requests generated by the web browser.

Figure 7:
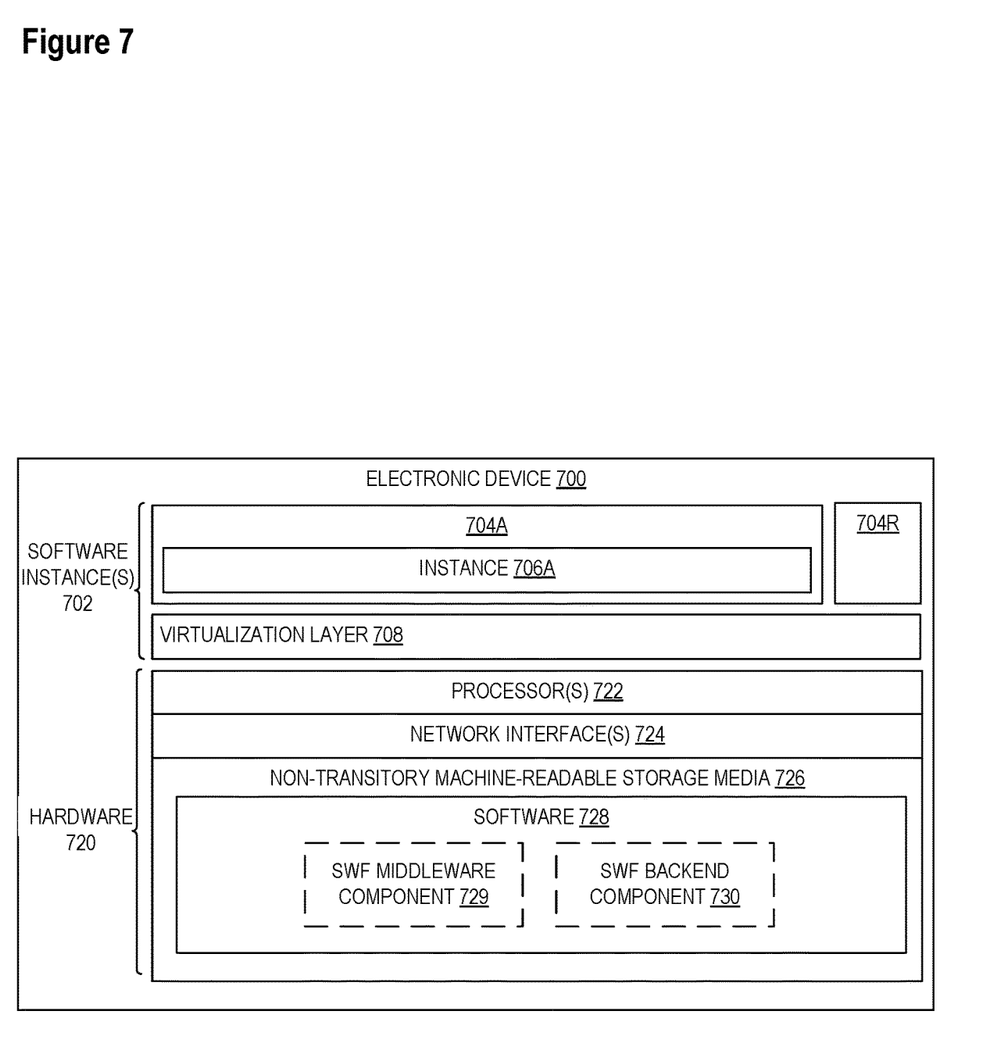
FIG. 7 is a block diagram illustrating an electronic/network device, according to some embodiments.

FIG. 7 is a block diagram illustrating an electronic/network device, according to some embodiments. FIG. 7 illustrates hardware 720 comprising a set of one or more processor(s) 722, a set of one or more network interfaces 724 (wireless and/or wired), and non-transitory machine-readable storage medium/media 726 having stored therein software 728 (which includes instructions executable by the set of one or more processor(s) 722). Software 728 can include code such as SWF middleware component 729 and/or SWF backend component 730, which when executed by hardware 720, causes the electronic device 700 to perform operations of one or more embodiments described herein (e.g., operations of a SWF middleware component or operations of a SWF backend component, as described herein).

In electronic devices that use compute virtualization, the set of one or more processor(s) 722 typically execute software to instantiate a virtualization layer 708 and software container(s) 704A-R (e.g., with operating system-level virtualization, the virtualization layer 708 represents the kernel of an operating system (or a shim executing on a base operating system) that allows for the creation of multiple software containers 704A-R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 728 (illustrated as instance 706A) is executed within the software container 704A on the virtualization layer 708. In electronic devices where compute virtualization is not used, the instance 706A on top of a host operating system is executed on the "bare metal" electronic device 700. The instantiation of the instance 706A, as well as the virtualization layer 708 and software containers 704A-R if implemented, are collectively referred to as software instance(s) 702.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by one or more network devices implementing a service worker firewall middleware component, comprising:
   causing a service worker firewall associated with a website to be installed on a web browser;
   sending a public key associated with the website to the service worker firewall;
   receiving a request from the service worker firewall for rules to be applied by the service worker firewall;
   responsive to receiving the request, obtaining one or more rules to be applied by the service worker firewall;
   sending a response to the service worker firewall, wherein the response includes the one or more rules, a digital signature for the one or more rules, and an indication of when the digital signature expires, wherein the digital signature is generated using a private key associated with the website that corresponds to the public key; and
   receiving a rules violation report from the service worker firewall, wherein the rules violation report was generated as a result of the service worker firewall applying the one or more rules to cross-origin requests generated by the web browser.

2. The method of claim 1, further comprising:
   determining whether a same-origin request generated by the web browser includes a predefined special header; and
   causing the service worker firewall to be installed on the web browser in response to a determination that the same-origin request does not include the predefined special header.

3. The method of claim 1, wherein the service worker firewall middleware component is communicatively coupled to a service worker firewall backend component, wherein the service worker firewall backend component generates and provides the one or more rules, the digital signature, and the public key to the service worker firewall middleware component.

4. The method of claim 3, further comprising:
   sending the rules violation report to the service worker firewall backend component.

5. The method of claim 1, wherein a rule from the one or more rules indicates a fact, an operator, an argument, and an event or a nested rule.

6. The method of claim 5, wherein the fact indicates a full uniform resource locator (URL), a pathname of a URL, a query string of a URL, an origin of a URL, a hostname of a URL, a header of a request, a body of a request, or a request method of a request.

7. The method of claim 5, wherein the operator indicates to check whether a fact is in a given array, to check whether a fact is not in a given array, to check whether a fact ends with a given string, to check whether a fact starts with a given string, to check whether a fact contains a given string, to check whether a fact is equal to a given string, to check whether a fact is not equal to a given string, or to check whether a fact matches a given regular expression.

8. The method of claim 5, wherein the event is a block event or an alert event.

9. A method by a network device implementing a web browser, comprising:
   installing a service worker firewall associated with a website on the web browser;
   obtaining, by the service worker firewall from a service worker firewall middleware component, a public key associated with the website;
   sending, by the service worker firewall to the service worker firewall middleware component, a request for rules to be applied by the service worker firewall;
   receiving, by the service worker firewall from the service worker firewall middleware component, a response to the request, wherein the response includes one or more rules to be applied by the service worker firewall, a digital signature for the one or more rules, and an indication of when the digital signature expires;
   determining, by the service worker firewall, whether the digital signature is valid based on the public key and the indication of when the digital signature expires; and
   applying, by the service worker firewall, the one or more rules to cross-origin requests generated by the web browser in response to a determination that the digital signature is valid.

10. The method of claim 9, wherein applying the one or more rules results in blocking a cross-origin request or sending a rules violation report.

11. The method of claim 9, further comprising:
    adding, by the service worker firewall, a predefined special header to same-origin requests generated by the web browser.

12. The method of claim 9, further comprising:
    storing the one or more rules in a client-side data storage.

13. The method of claim 9, further comprising:
    periodically sending, by the service worker firewall to the service worker firewall middleware component, a request for rules to be applied by the service worker firewall.

14. The method of claim 9, wherein the web browser obtains service worker firewall code using a first predetermined uniform resource locator (URL), wherein the request for rules is sent using a second predetermined URL.

15. A non-transitory machine-readable storage medium that provides instructions that, if executed by a processor of a network device implementing a service worker firewall middleware component, will cause said service worker firewall middleware component to perform operations comprising:
    causing a service worker firewall associated with a website to be installed on a web browser;
    sending a public key associated with the website to the service worker firewall;
    receiving a request from the service worker firewall for rules to be applied by the service worker firewall;
    responsive to receiving the request, obtaining one or more rules to be applied by the service worker firewall;
    sending a response to the service worker firewall, wherein the response includes the one or more rules, a digital signature for the one or more rules, and an indication of when the digital signature expires, wherein the digital signature is generated using a private key associated with the website that corresponds to the public key; and receiving a rules violation report from the service worker firewall, wherein the rules violation report was generated as a result of the service worker firewall applying the one or more rules to cross-origin requests generated by the web browser.

16. The non-transitory machine-readable storage medium of claim 15, wherein the operations further comprise:

determining whether a same-origin request generated by the web browser includes a predefined special header; and causing the service worker firewall to be installed on the web browser in response to a determination that the same-origin request does not include the predefined special header.

17. The non-transitory machine-readable storage medium of claim 15, wherein the service worker firewall middleware component is communicatively coupled to a service worker firewall backend component, wherein the service worker firewall backend component generates and provides the one or more rules, the digital signature, and the public key to the service worker firewall middleware component.

18. The non-transitory machine-readable storage medium of claim 17, wherein the operations further comprise:

sending the rules violation report to the service worker firewall backend component.

19. The non-transitory machine-readable storage medium of claim 15, wherein a rule from the one or more rules indicates a fact, an operator, an argument, and an event or a nested rule.

20. The non-transitory machine-readable storage medium of claim 19, wherein the fact indicates a full uniform resource locator (URL), a pathname of a URL, a query string of a URL, an origin of a URL, a hostname of a URL, a header of a request, a body of a request, or a request method of a request.

* * * * *